United States Patent
Cramer

[15] 3,702,504
[45] Nov. 14, 1972

[54] AIRCRAFT INSTRUMENT OPERATION TRAINER

[72] Inventor: Harry E. Cramer, Seattle, Wash.

[73] Assignee: Cramer Instrument Flight School, Inc., Seattle, Wash.

[22] Filed: June 17, 1970

[21] Appl. No.: 46,871

[52] U.S. Cl. ................................................35/12 W
[51] Int. Cl. .............................................G09b 9/08
[58] Field of Search..........35/12 F, 12 L, 12 W, 12 D, 35/10.2

[56] References Cited

UNITED STATES PATENTS

| 3,378,938 | 4/1968 | Frasca | 35/12 W |
| 2,336,711 | 12/1943 | Barber | 35/12 W |
| 3,534,486 | 10/1970 | Frasca et al. | 35/12 L |
| 2,179,663 | 11/1939 | Link, Jr. | 35/10.2 |
| 3,310,884 | 3/1967 | Weitzman et al. | 35/12 D |

*Primary Examiner*—Wm. H. Grieb
*Attorney*—Robert W. Beach

[57] ABSTRACT

On one side of a portable case are mounted aircraft instruments, a control wheel and a throttle to simulate the instrument panel and controls of an airplane. The control wheel and throttle are movable and interconnected by compound lever mechanism which is connected to actuate the tachometer, the airspeed indicator, the artificial horizon elevationally, the rate-of-climb indicator and the altimeter. The control wheel is connected independently of the compound lever to actuate the turn indicator, the tilting of the artificial horizon, the directional gyro, a VHF omnirange indicator, a course recorder and an automatic direction finder.

14 Claims, 20 Drawing Figures

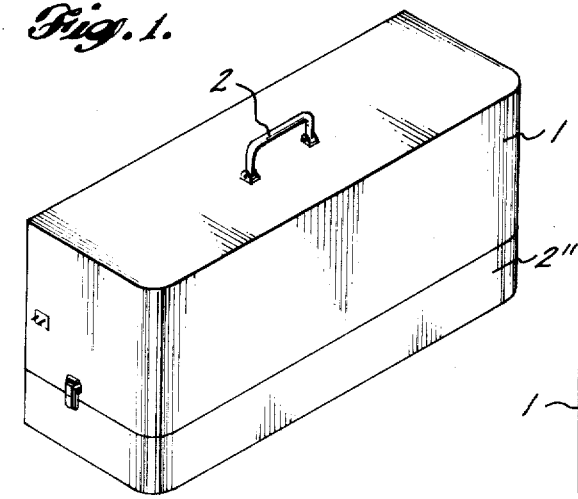
Fig. 1.
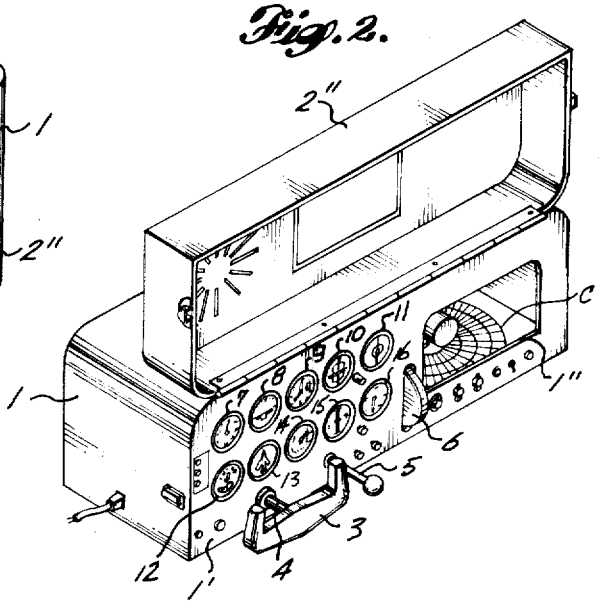
Fig. 2.
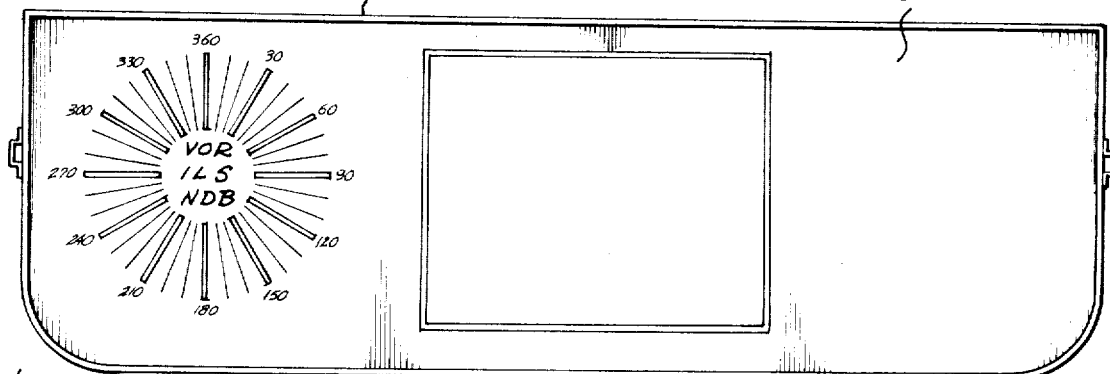
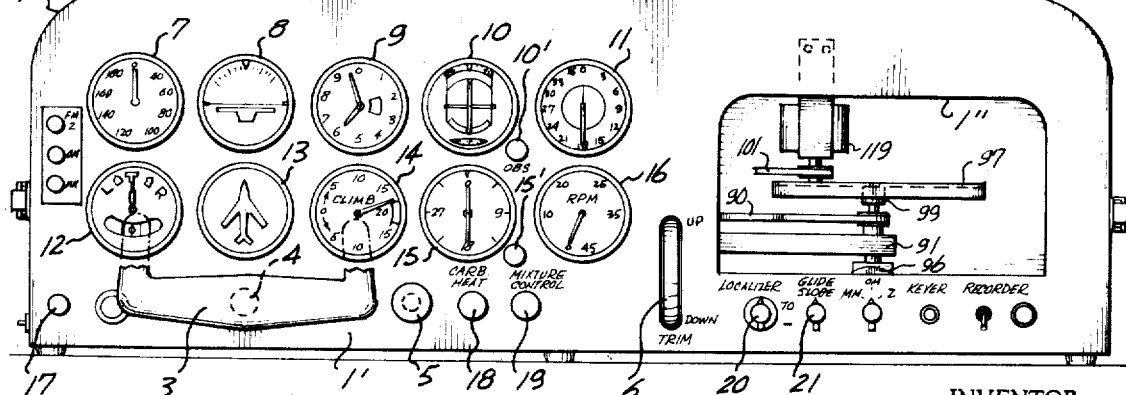
Fig. 3.
INVENTOR.
HARRY E. CRAMER
BY
Robert W. Beach
ATTORNEY INVENTOR.
HARRY E. CRAMER
BY Robert W. Beach
ATTORNEY

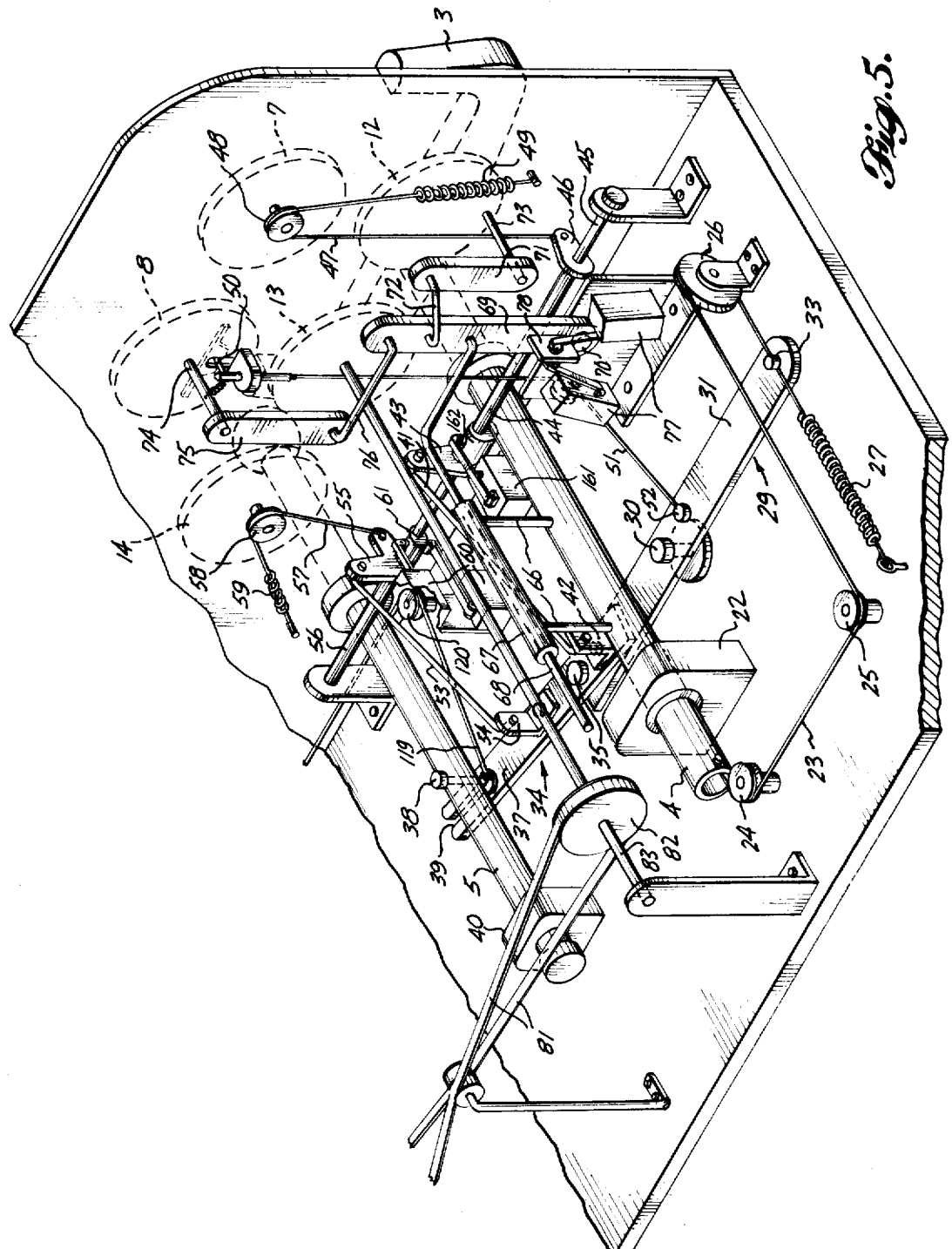

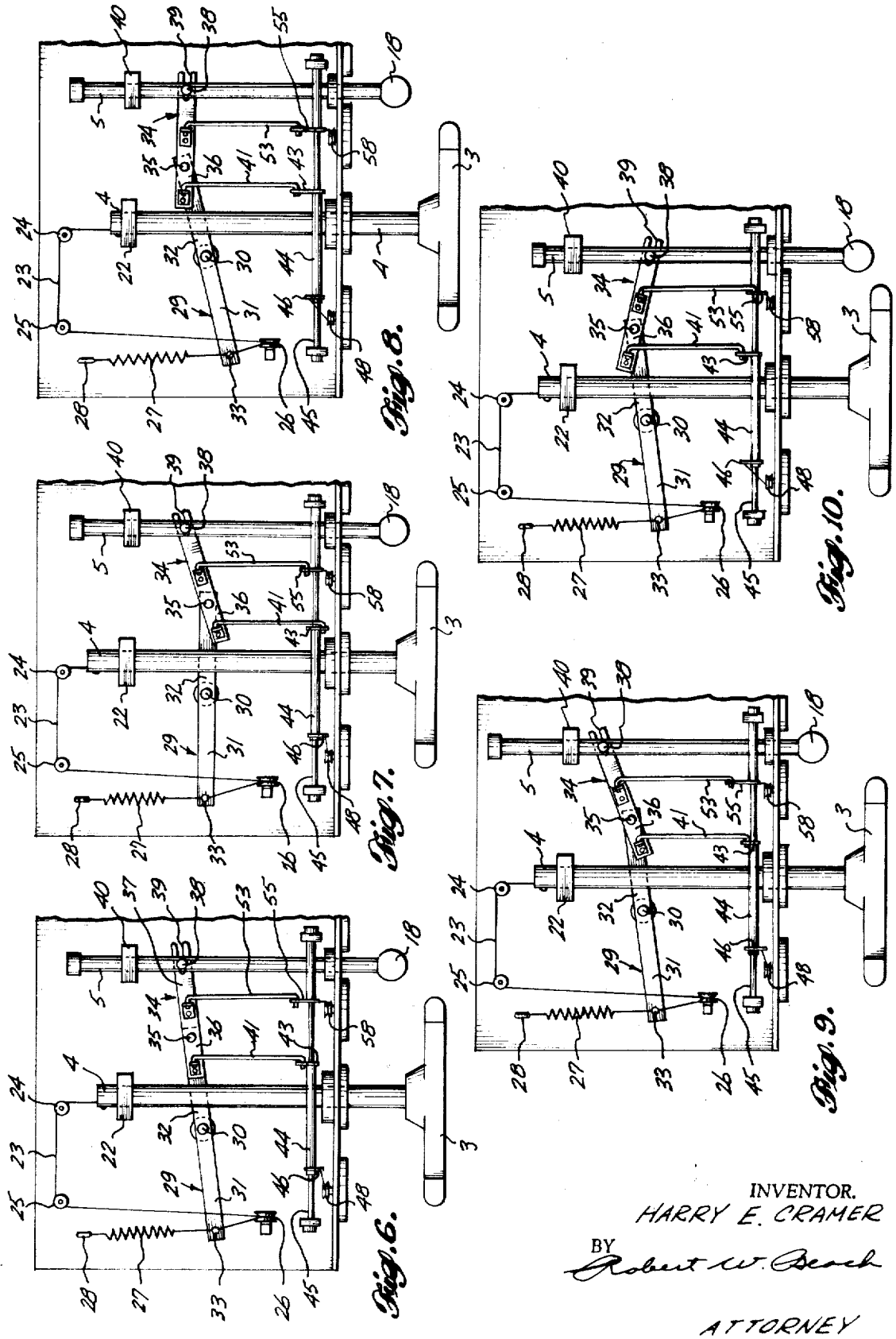

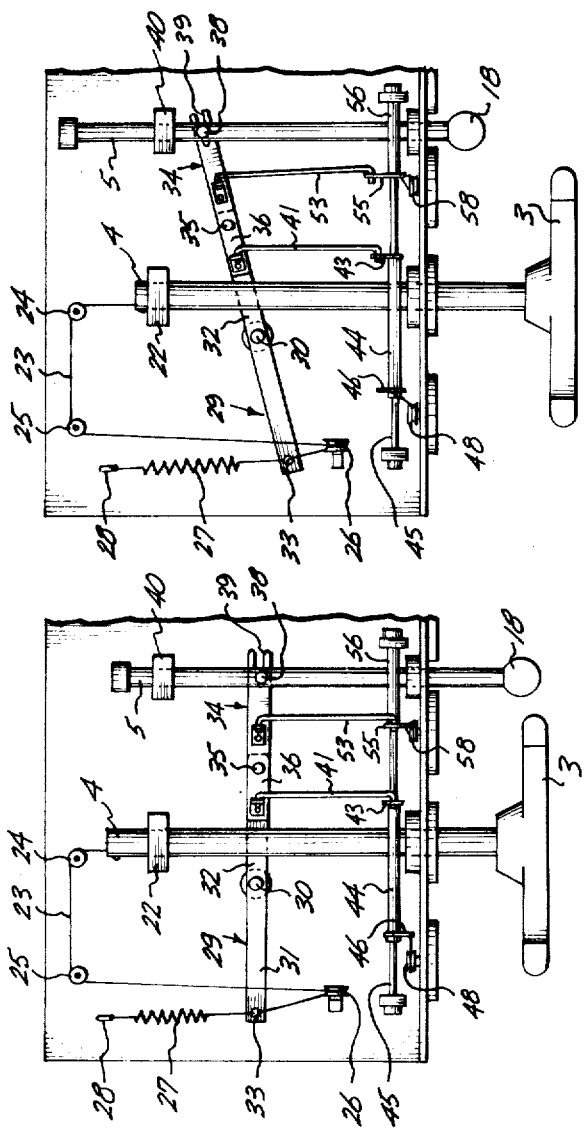

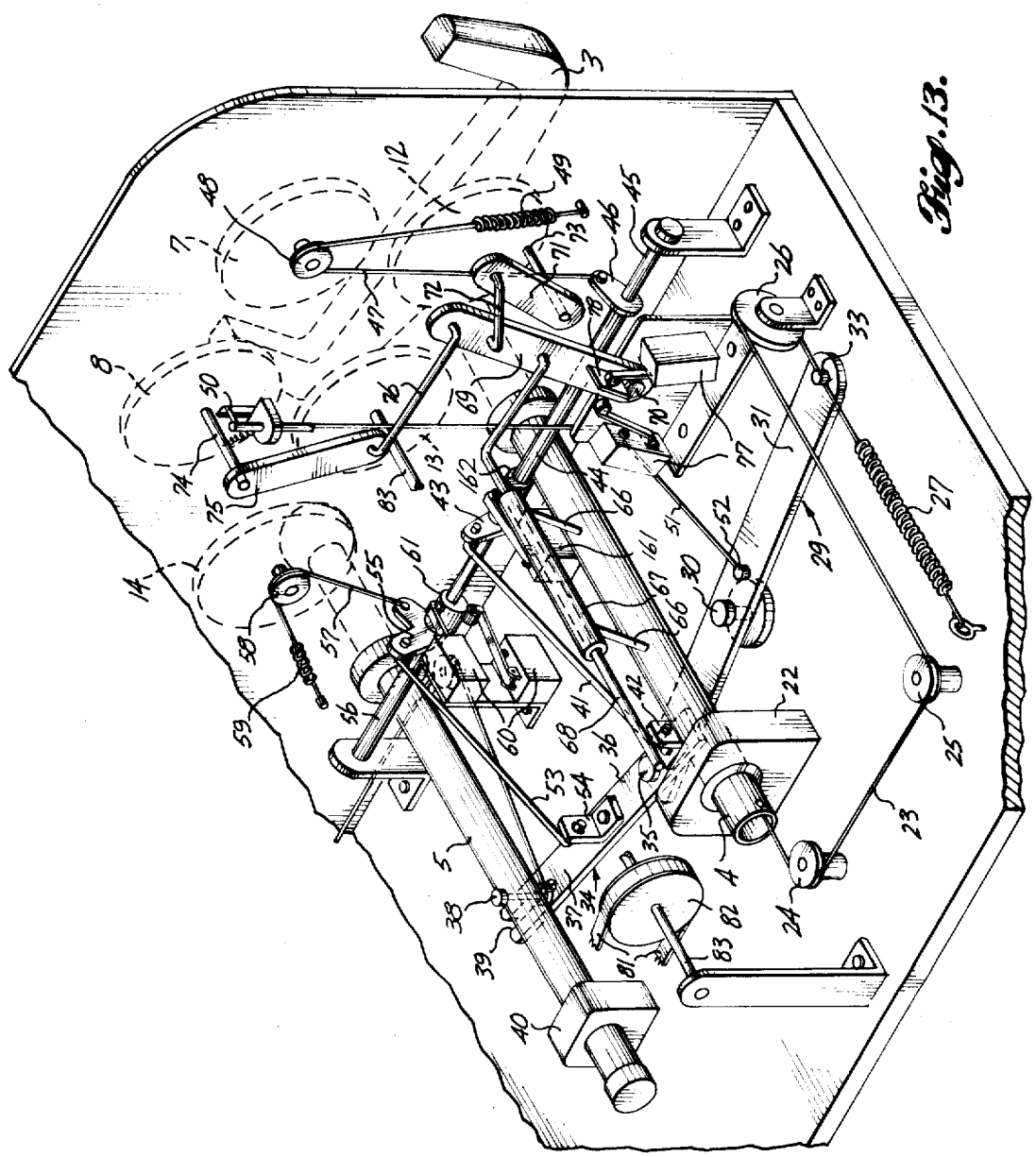

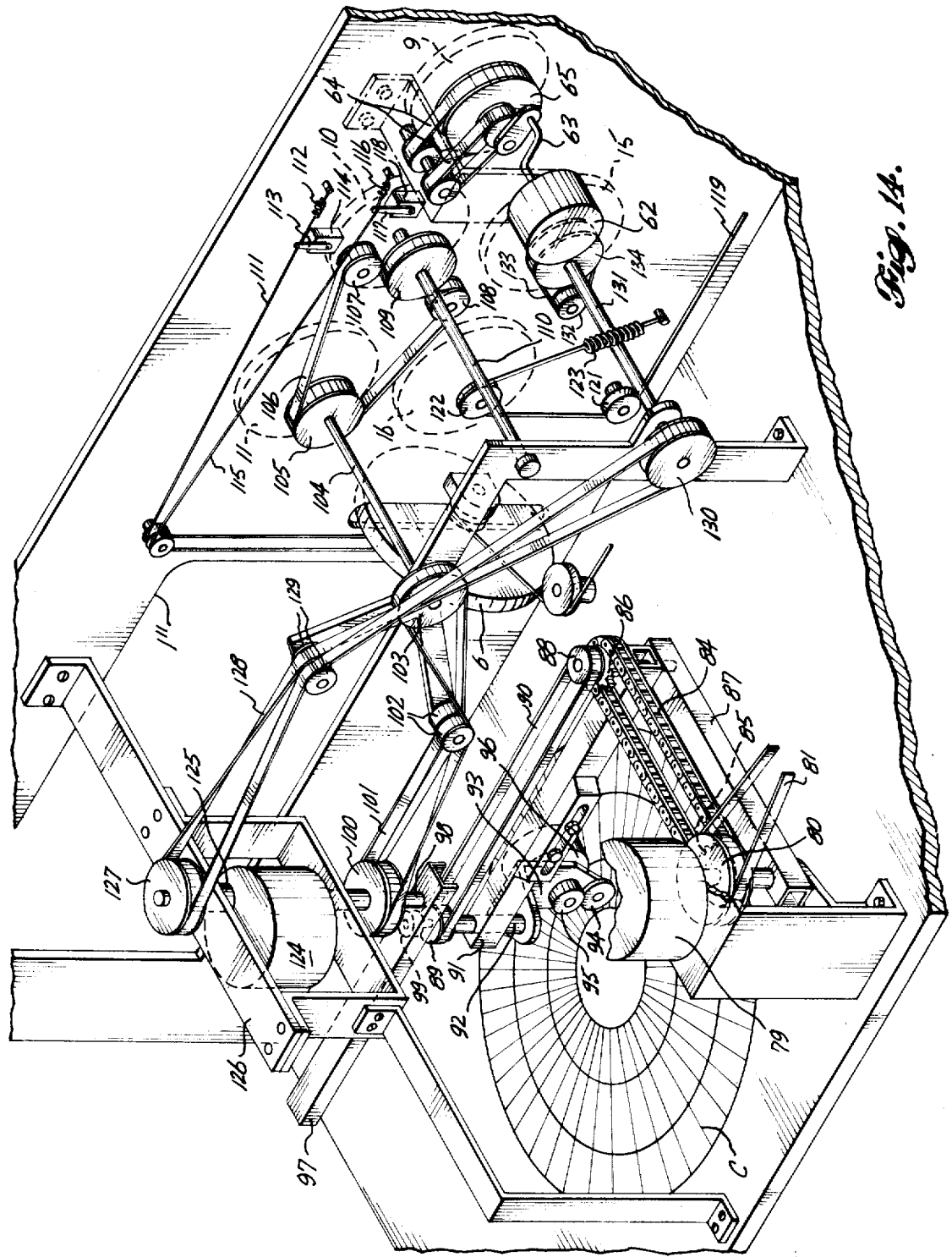

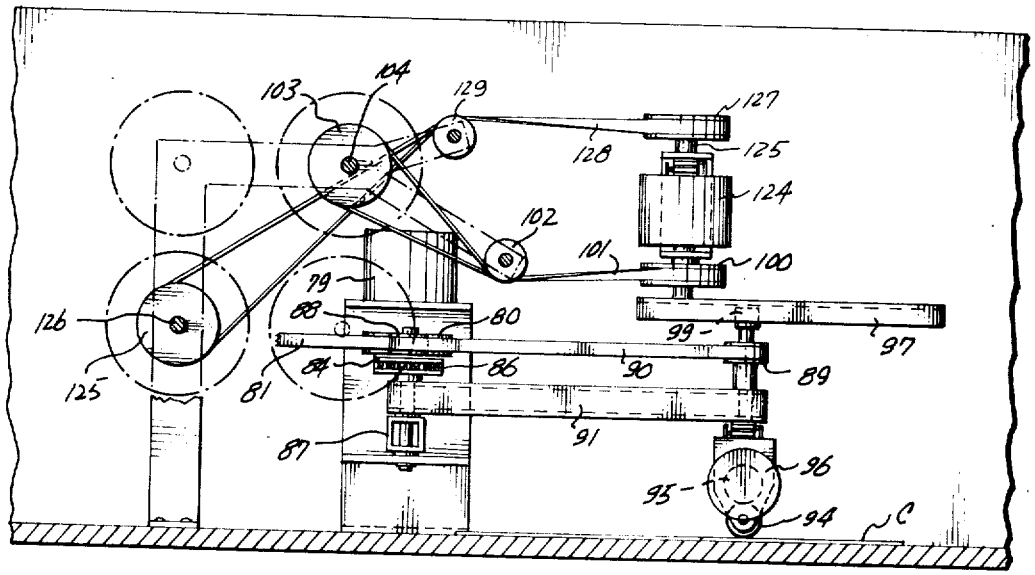
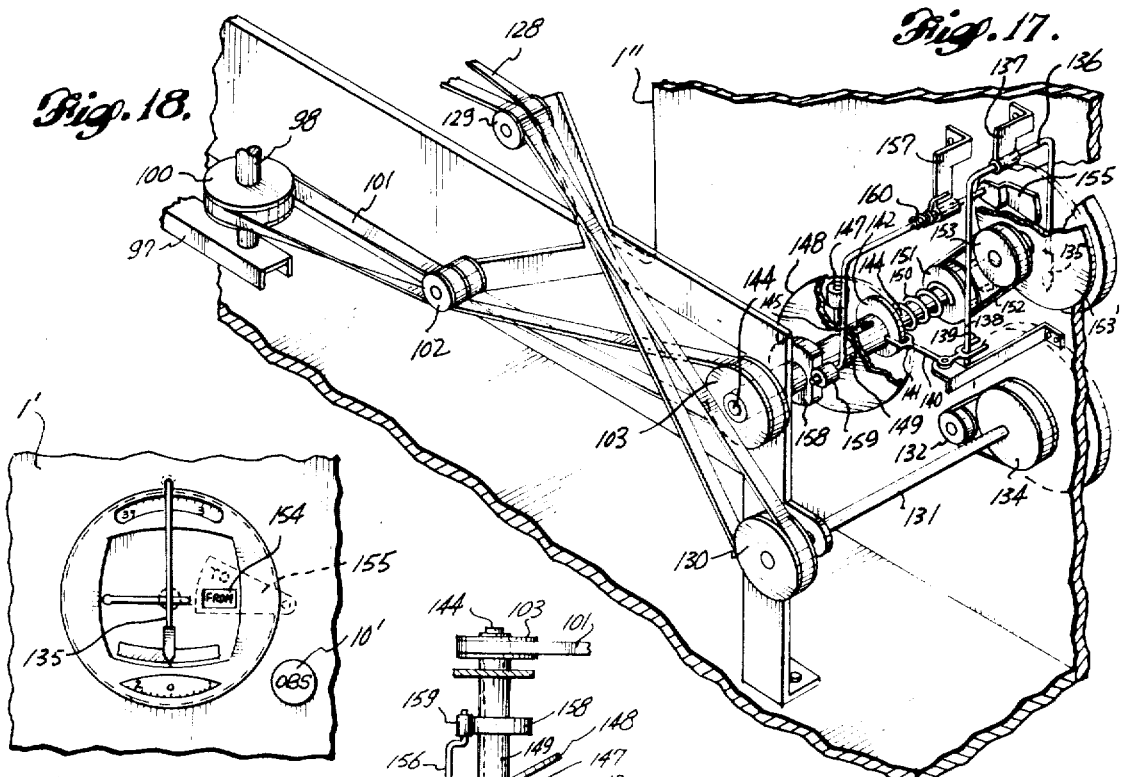
Fig. 17.
Fig. 18.
Fig. 19.
Fig. 20.
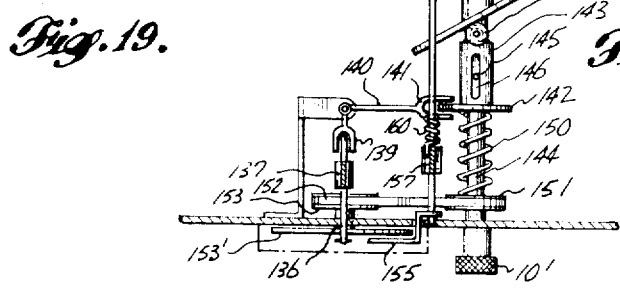
INVENTOR.
HARRY E. CRAMER
BY
Robert W. Beach
ATTORNEY

AIRCRAFT INSTRUMENT OPERATION TRAINER

The aircraft instrument operation trainer of the present invention is to be used in the classroom for illustrating the technique of aircraft instrumentation operation and use in a qualitative manner rather than in a quantitative manner. Consequently, the principles of operation are demonstrated instead of being concerned with precise duplication of actual flight conditions.

A principal object of the invention is to provide an economical trainer which is compact and light so as to be portable, yet which is sufficiently realistic so that a pilot can benefit from his operation of the trainer nearly to the same extent as in operating an airplane as far as the principles of operation are concerned.

In providing a realistic training experience for the pilot, it is an object to provide controls and instruments which closely simulate the actual controls and instruments in a light airplane and which controls and instruments are interconnected so that movement of the flight and engine controls to simulate a flight maneuver will effect movement of the instruments in a manner corresponding to the instrument movement which would result from the performance of an airplane maneuver produced by such control movement.

Another object is to provide a recorder for recording a simulated flight path of the general character which would be followed by an airplane if its controls were manipulated in the manner that the trainer controls are manipulated. In particular, it is an object to coordinate turning movement of the control wheel with the course recorder so that the recorder will record the course which would be steered by the airplane. In this connection, it is a further object to provide a course-indicating instrument for use by an instructor.

It is also an object to provide an aircraft instrument operation trainer having the capabilities mentioned above which is principally of mechanical construction and does not use electronic controls, so as to curtail the initial cost of the apparatus and to minimize maintenance expense.

FIG. 1 is a top perspective of the portable aircraft instrument operation trainer in carrying condition;

FIG. 2 is a top front perspective of the trainer set up for instructional operation;

FIG. 3 is a front elevation of the trainer prepared for instructional operation;

FIG. 5 is an enlarged rear top perspective of one end portion of such chassis;

Figure 4:
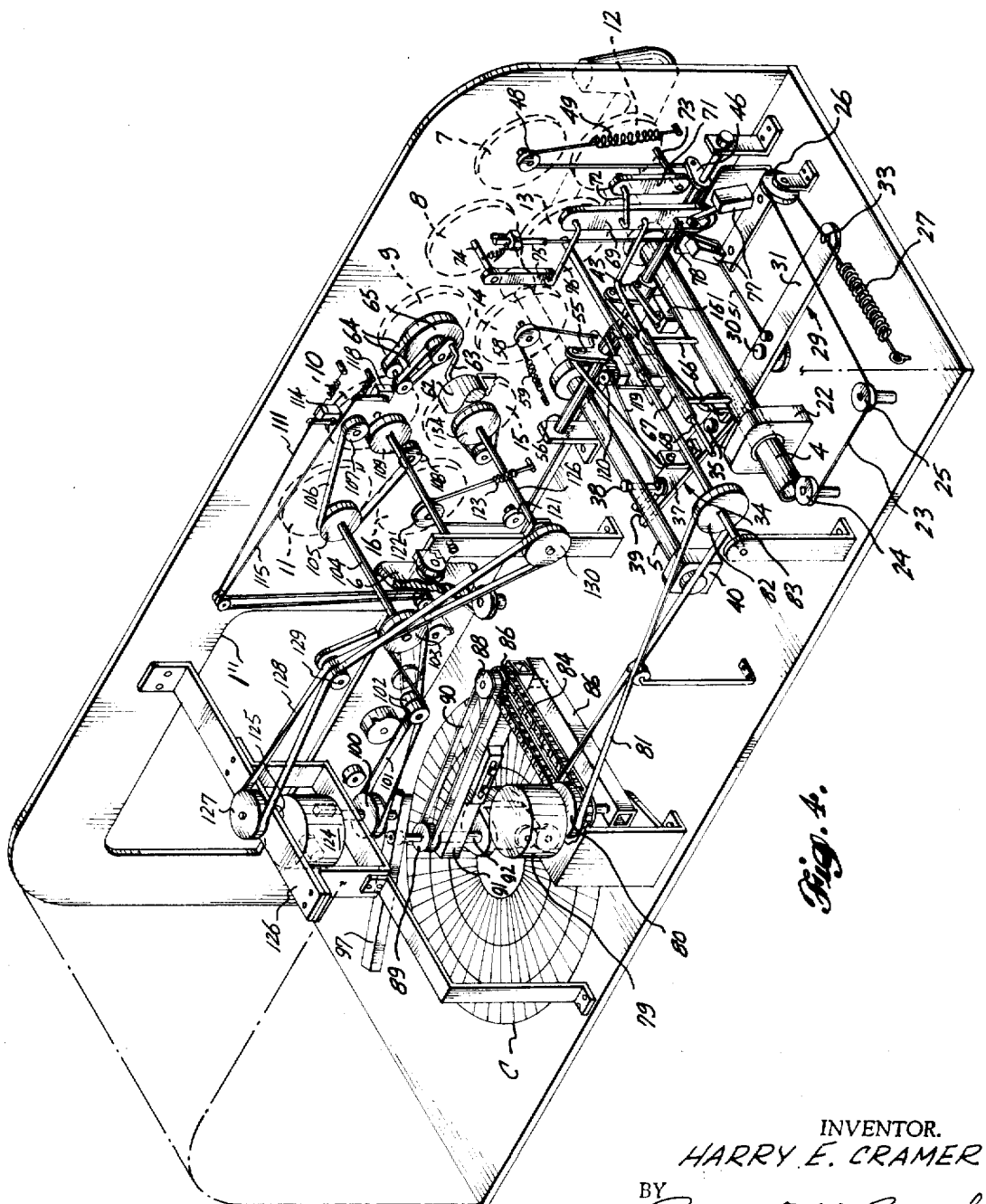
FIG. 4 is a rear top perspective of the chassis of the trainer.
Figure 15:
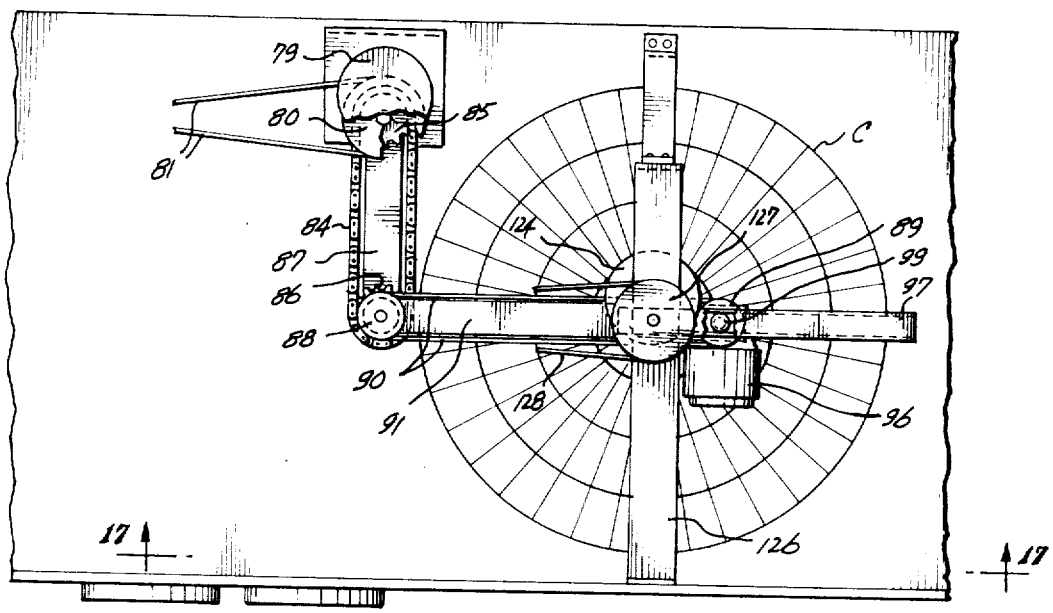
Figure 16:
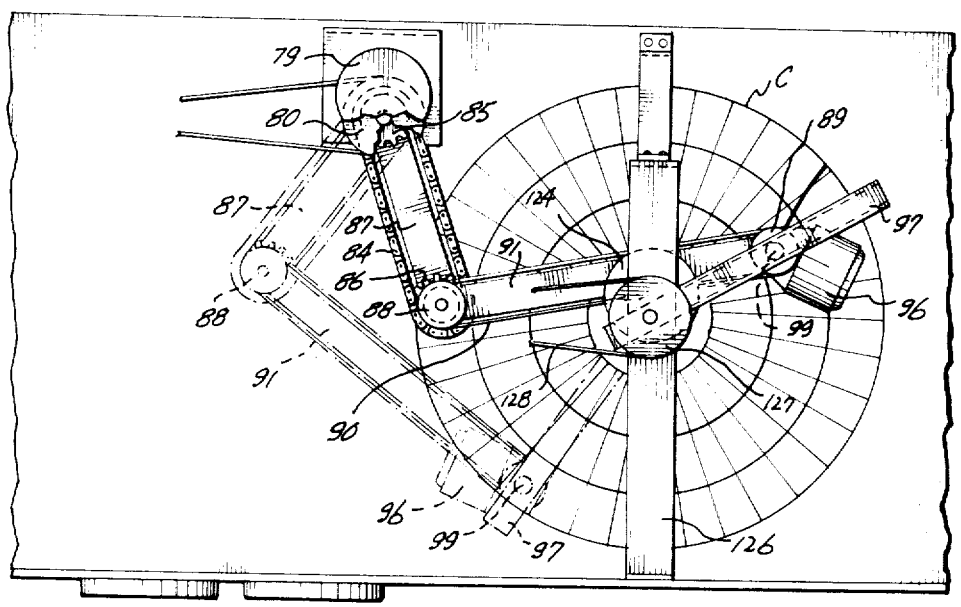

FIGS. 6 to 12, inclusive, are somewhat diagrammatic plans of the portion of the chassis shown in FIG. 5, illustrating components in different operative relationships, and FIG. 13 is a rear top perspective of the end portion of the chassis like that shown in FIG. 5, but with parts in an operative relationship different from the relationships illustrated in FIGS. 5 to 12, inclusive;

FIG. 14 is a rear top perspective of the left end portion of the chassis as seen in FIG. 4 on an enlarged scale;

FIGS. 15 and 16 are plans of the same end portion of the chassis and

FIG. 17 is a section taken on line 17—17 of FIG. 15;

FIG. 18 is a rear top perspective of a portion of the mechanism illustrated in FIG. 14 showing an alternate form of apparatus and having parts broken away;

FIG. 19 is a plan of a portion of the mechanism shown in FIG. 18, and

FIG. 20 is a front elevation of a portion of the mechanism viewed from line 20—20 of FIG. 19.

A principal advantage of the flight trainer of the present invention is its portability while still giving the general impression of an actual airplane instrument panel. The trainer is portable because the mechanism is contained in a casing 1 small enough and light enough to be carried easily by a handle 2. The side of the case opposite that to which the handle is attached is closed by a cover 2'. Such side of the case constitutes the instrument panel 1', having in it an opening 1" affording access to a portion of the interior of the casing. The inside 2" of the cover 2' when the cover is in the open position of FIG. 2 provides a surface for display of problem-solving data, or a holder for a written flight plan or navigational problem. Such surface may provide an erasible drawing area and a surface of magnetic material to which magnetized airplane models may be applied.

Supported from the casing 1 is a control wheel 3 mounted on a control shaft 4 which can be reciprocated and rotated by a student pilot using the trainer. Alongside the control wheel, the casing carries the throttle 5 which can be reciprocated to simulate the control of engine speed. A trim control wheel 6 may be rotated to simulate correction for elevational control of the aircraft. It may be connected through spring means to the control shaft 4 for varying the force required to be exerted on the control wheel to move it forward or rearward.

The instruments mounted on the instrument panel face 1' of the case are either actual airplane instruments or closely simulate such instruments. The top row of instruments as seen in FIG. 3 are, from left to right, an airspeed indicator 7, an artificial horizon 8, an altimeter 9, a very high frequency omnirange indicator (VOR) or instrument landing system indicator (ILS) 10 and and instructor's VOR—ILS monitor 11.

In the lower row of instruments, designated from left to right as seen in FIG. 3, are a turn indicator 12, a directional gyro 13 for indicating heading, a rate-of-climb indicator or climb indicator or vertical speed indicator 14, an automatic direction finder (ADF) 15 and a tachometer 16. Simulated controls of various types may be arranged along the bottom of the panel including an ignition switch 17, which can function as the master switch for the electrical components of the trainer, a carburetor heat control 18 and a fuel mixture control 19. A localizer selector 20 and a glide-slope selector 21 may be provided to be manipulated for indicating recognition that the VOR—ILS indicator is to be used for different functions.

While the normal aircraft controls include separate controls for controlling the rudder and the ailerons of the airplane, it is elementary that movement of the elevator controls and aileron controls must be coordinated by the pilot in order to accomplish proper turn-and-bank maneuvers. From a navigational point of view, the important consideration is the degree and duration of the turning of the airplane. Consequently, for instrument operation training purposes, the turning of the control wheel 3 is adequate to simulate a turning maneuver of the airplane.

In general, therefore, the trainer serves two functions; first, to indicate to the student pilot the action produced on the instruments by the airplane maneuvers effected by certain manipulations of the flight and engine controls, and second, to enable the student pilot to execute navigational problems in principle by manipulation of the flight controls for simulating a predetermined flight path of the airplane. While the present trainer is capable of both functions, a similar trainer could be constructed to provide only one or the other of such functions.

First, with respect to the function of the instruments reflecting the effect on the airplane produced by manipulation of the controls, it is known that independent operation of the control wheel and of the throttle can produce corresponding effects on the attitude of the airplane. Thus, if the control wheel 3 is pulled rearward, simulating upward deflection of the elevators, without movement of the throttle, the airspeed of the airplane should be reduced, the rate of climb should increase and the horizon should drop. The same general phenomena should occur with respect to increase in rate of climb and dropping of the horizon if the throttle 5 is pushed forward, but the airspeed should increase instead of decreasing.

Conversely, if the control wheel 3 is pushed forward, representing downward deflection of the elevators, without the throttle 5 being moved from normal cruising position, the airspeed should increase, the rate of climb should decrease and the horizon should rise. On the other hand, if the throttle 5 is pulled rearward while the control wheel 3 remains in normal level flight position, the rate of climb should decrease and the horizon should rise, but the airspeed should be reduced instead of increasing.

It is therefore evident that if the airspeed indicator 7, the rate-of-climb indicator 14 and the artificial horizon 8 are to reflect maneuvers of the airplane accomplished by forward or rearward movement of the control wheel 3 and/or forward or rearward movement of the throttle 5, the movements of such control wheel and throttle must be coordinated in the activation of the airspeed indicator, the rate-of-climb indicator and the artificial horizon. Movements of these two control elements must also be coordinated if the altimeter 9 is to reflect assumed changed in altitude resulting from an indicated positive or negative rate of climb. To accomplish coordinated influence of the movements of the control wheel 3 and of the throttle 5 on such instruments, such control elements are mechanically interconnected.

The shaft 4 on which the control wheel 3 is mounted is both reciprocable and rotatable by corresponding movement of the control wheel. Such shaft is mounted in a bearing on the control panel 1' and in a bearing 22 spaced a substantial distance forwardly of the control panel. A flight control-actuating cable 23 has one end connected to the forward end of the control wheel shaft. This cable extends from such shaft around guide pulleys 24 and 25 mounted on the chassis to turn about upright axes and is return bent around a guide pulley 26 mounted on the trainer chassis to rotate about a horizontal axis. The other end of the control cable is secured to one end of the tensioning spring 27, the other end of which is secured to the spring anchor 28.

The central portion of a main control-actuating lever 29 is mounted on a pivot 30 guiding the lever to swing about an upright axis. The length of such lever extends transversely of the control wheel shaft 4 and generally parallel to the instrument panel 1'. Such pivot divides the lever into an input arm 31 at one side of the pivot and an output arm 32 at the opposite side of the pivot. The flight control cable 23 is secured to the end of the main lever input arm remote from pivot 30 by a connection 33.

The main control-actuating lever 29 is part of a compound lever system including an auxiliary lever 34 which is mounted by the pivot 35 on a portion of the main lever output arm 32 remote from the pivot 30. Such auxiliary lever is divided by pivot 35 into an output arm 36 overlapping the main lever and an input arm 37 projecting beyond the output arm 32 of the main lever and connected to the throttle 5. Such connection, as shown best in FIGS. 5 and 13, includes a pin 38 carried by the throttle 5 which is received in a slot 39, the length of which extends lengthwise of the auxiliary lever input arm 37.

The compound lever mechanism is preferably arranged so that when the control wheel 3 and the throttle 5 are disposed in position corresponding to normal level cruising flight, as shown in FIG. 6, the main control actuating lever 29 and the auxiliary lever 34 will be disposed in substantially parallel overlying registry generally parallel to the instrument panel 1' although not necessarily precisely parallel to it. The throttle 5 is mounted for lengthwise reciprocation in a bearing mounted on the instrument panel and a bearing 40 spaced forward from the instrument panel so that lengthwise reciprocation of the throttle will effect movement of the pin 39 connecting the throttle and the auxiliary lever 34 in a direction transversely of the length of such lever.

As mentioned above, reciprocation of the control wheel 3 and throttle 5 cooperate to alter the airspeed, the rate of climb and the elevation of the airplane symbol relative to the horizon. Consequently, the compound lever system 29, 34 must be connected to the airspeed indicator 7, the rate-of-climb indicator 14 and the artificial horizon 8. In addition, movement of the lever system must be arranged to drive the altimeter 9 up or down in accordance with the actuation of the rate-of-climb indicator 14.

The connections between the compound lever system, the airspeed indicator, the artificial horizon, the rate-of-climb indicator and the altimeter are shown best in FIGS. 4 to 13, inclusive. The airspeed indicator drive link 41 has one end connected to a lug 42 mounted on the arm 36 of the auxiliary lever 34. The opposite end of this link is connected to an arm 43 mounted on the airspeed-indicator actuator drive sleeve 44. Such drive sleeve is supported by the mounting rod 45 extending through it.

Such airspeed-indicator actuator drive sleeve 44 carries an output lever 46, the swinging end of which is connected to a drive belt 47 passing around the drive pulley 48 of the airspeed indicator. Such drive belt is held taut by its end remote from lever 46 being connected to an anchored tensioning spring 49. Such spring has sufficient flexibility to stretch for enabling the drive belt 47 to move lengthwise for turning the airspeed indicator drive pulley 48 as the lever 46 swings.

The airplane symbol slide of the artificial horizon is moved elevationally by the vertically reciprocable actuator 50 spring-pressed upwardly and movable downwardly by a pull on the artificial horizon control cable 51. The other end of this control cable is connected by a lug 52 to the arm 31 of the lever 29 at a location close to the pivot 30 so that, as such main lever swings, the reciprocable slide actuator 50 will move elevationally only a small amount.

The rate-of-climb indicator 14 is actuated by lengthwise reciprocation of a link 53 one end of which is connected to a lug 54 mounted on the arm 37 of the auxiliary lever 34. The other end of this link is connected to one arm of a bell crank 55 carried by a mounting sleeve 56 that encircles and is supported by the stationary mounting rod 45. The other arm of such bell crank is connected to one end of a drive belt 57 that extends around the rate-of-climb indicator drive pulley 58. The other end of such drive belt is connected to an anchoring belt-tensioning spring 59.

FIGS. 5 to 12 illustrate the control wheel 3 and throttle 5 in various relatively reciprocated relationships producing a variety of effects on the compound-lever mechanism and in turn on the airspeed indicator, rate-of-climb indicator and artificial horizon. First, considering the effect of the reciprocation of the flight control wheel 3 on the compound lever system, FIGS. 6, 7 and 8 show the throttle 5 in the same position of adjustment in each instance, which may be assumed to be the adjusted position corresponding to cruising speed. In FIG. 6, the control wheel 3 is positioned so that the airplane is assumed to be flying horizontally. The two levers 29 and 34 are in overlying alignment or registry and the links 41 and 53 and the cable 51 are located so that the airspeed indicator 7 indicates cruising speed, the rate-of-climb indicator 14 indicates zero rate of climb or descent and the artificial horizon 8 indicates level flight.

If the control wheel 3 is pushed forward somewhat from the position of FIG. 6 to that of FIG. 7, representing downward swinging of the elevator, the spring 27 in maintaining tension on the control-actuating cable 23 shortens and pulls the attachment 33 of the control cable to the arm 31 of lever 29 to swing such lever from the position of FIG. 6 to that of FIG. 7. Such swinging moves the lever-connecting pivot 35 from the position of FIG. 6 to that of FIG. 7, which swings the lever 34 about the throttle pin 39 as an axis. The airspeed indicator drive link 41 and the rate-of-climb indicator drive link 53 are both reciprocated lengthwise rearward toward the instrument panel 1', the link 41 being shifted a distance greater than the link 53.

Such rearward shifting of link 41 will swing arm 43 toward the instrument panel to rotate sleeve 44 for swinging arm 46 downward which pulls drive belt 47 to rotate the airspeed indicator drive pulley 48 in a clockwise direction as viewed from the front of the instrument panel. Such rotation of the pulley will cause the airspeed indicator needle to indicate an increased air speed, which would result from the descent of an airplane that would be induced by downward swinging of the elevators effected by moving control wheel 3 forward.

Movement of the rate-of-climb indicator drive link 53 lengthwise rearward will pull the drive belt 57 to rotate drive pulley 58 in the counterclockwise direction, thus indicating a reduced rate of climb or, in this instance, an increased rate of descent. The pull on control cable 51 which actuates the artificial horizon slide will move the actuator 50 to indicate an elevation of the horizon or descending attitude of the airplane.

If instead of the control wheel 3 being pushed forward from the position of FIG. 6 to the position of FIG. 7 such wheel is pulled rearward to the position of FIG. 8, again without changing the position of the throttle 5, the lever 29 will be deflected relative to the lever 34 as seen in FIG. 8, that is, in the direction opposite that in which it was displaced in FIG. 7. The effect of such control wheel movement will be to move the airspeed indicator drive link 41 lengthwise forward for swinging levers 43 and 46 to move drive belt 47 for turning the airspeed indicator drive pulley 48 in a counterclockwise direction to indicate a reduction in speed. Such reduction in speed would be correlated with the movement of the control wheel simulating a climb.

The link 53 would also be moved lengthwise and forward by swinging of auxiliary lever 34 about the throttle connecting pin 39, but to a lesser degree. Such forward movement would swing the belt crank 55 for relieving the tension on the drive belt 57 so that the rate-of-climb indicator pulley 58 would turn in a clockwise direction as seen from the front of the instrument panel, indicating an increased rate of climb.

The swinging of arm 31 of the lever 29 from the position of FIG. 6 to that of FIG. 8 would relieve the tension on the artificial horizon actuating cable 51 so that the actuator 50 would rise, indicating a lowering of the horizon.

In FIGS. 9 and 10, the control wheel 3 has been left in the level cruising flight position of FIG. 6, and in FIG. 9 the throttle 5 has been advanced by pushing it forward, while in FIG. 10 the throttle has been retarded by pulling it rearward from the position of cruising speed shown in FIG. 6. The forward movement of the throttle to the position of FIG. 9 will swing auxiliary lever 34 relative to the main lever 29, which remains stationary, to move link 41 lengthwise rearward. Such lever movement swings the arms 43 and 46 for increasing the tension on airspeed indicator drive belt 47 which will turn the drive pulley 48 in a clockwise direction to indicate an increase in air speed. Instead of the link 53 also being moved lengthwise rearward, however, such link will be moved forward away from the instrument panel. Such movement will decrease the tension of spring 59 on rate-of-climb indicator drive belt 57 so that the drive belt 57 will move to turn pulley 58 in a clockwise direction as seen from the front of the instrument panel, indicating an increase in the rate of climb.

It will be observed from a comparison of FIGS. 7 and 9 that, while the airspeed is indicated as being increased both by movement of the control wheel forward and by movement of the throttle forward, the rate of climb is decreased by forward movement of the control wheel while being increased by forward movement of the throttle in conjunction with an increase in air speed in both instances.

In FIG. 10, rearward movement of the throttle 5 to simulate a reduction in power has swung lever 34 on its pivot 35 relative to lever 29 to move the air speed indicator drive link 41 forward and the rate-of-climb indicator drive link 53 rearward. Such forward movement of the air speed indicator drive link has swung arms 43 and 46 so as to relieve the tension on the drive belt 47 and caused the drive pulley 48 to rotate in a counterclockwise direction as seen from the front of the instrument panel, indicating a reduction in air speed. The rearward movement of link 53 has swung bell crank 55 to increase the tension on the rate-of-climb indicator drive belt 57 to effect turning of the drive pulley 58 in a counterclockwise direction, indicating a reduction in the rate of climb.

Comparing the action of the compound linkage in FIG. 8 and 10, it will be seen that rearward movement of the control wheel and rearward movement of the throttle both effect forward movement of the airspeed indicator drive link 41 to indicate a decrease in air speed, but when the control wheel is moved rearward the rate-of-climb indicator link is moved forward to produce an indication of increased rate of climb, whereas when the throttle is moved rearward, the rate-of-climb indicator drive link 53 will also be moved rearward to effect an indication of a reduction in rate-of-climb.

In actual flight maneuvers, the control wheel and the throttle are frequently moved at the same time. Thus, to perform a glide, the control wheel will be moved forward from the level flight cruising condition of FIG. 6 while the throttle will be moved rearward from the cruising power position, so as to be disposed in the relationship shown in FIG. 11. By such manipulation of the controls, the levers 29 and 34 may be turned conjointly about the pivot 30 into the positions shown in FIG. 11. By such movement, both the airspeed indicator drive link 41 and the rate-of-climb indicator drive link 53 will have been shifted lengthwise rearwardly, but in this instance, the link 53 will be shifted to a greater extent than the link 41 instead of, as in FIG. 7, the link 41 being shifted to a greater extent than the link 43.

As in the maneuver of FIG. 7, rearward movement of link 41 will swing arms 43 and 46 to move the drive belt 47 for turning the pulley 48 to indicate an increase in air speed, but such increase will be much less than in the situation of FIG. 7. Also, rearward movement of link 53 will swing bell crank 55 to pull drive belt 57 for turning pulley 58 to indicate a decrease in rate of climb, that is, a descent. In this instance, however, the rate of descent indicated will be much greater than that indicated by the condition of FIG. 7.

FIG. 12 illustrates the opposite type of maneuver from that illustrated by FIG. 11. In this instance, the control wheel 3 has been pulled rearward from the position of FIG. 6 and the throttle 5 has been pushed forward, simulating a power climb. In this instance, the two levers 29 and 34 again are shown as being in superposed registry, but swung about the pivot 30 of the compound lever system from the position of FIG. 6 in the direction opposite to that in which the lever system is shown to have been swung in FIG. 11. By this manipulation, both the airspeed indicator drive link 41 and the rate-of-climb indicator drive link 53 have been shifted lengthwise forward and the link 53 has been shifted to a greater extent than the link 41, instead of vice versa as shown in FIG. 8.

Again, the forward shifting of link 41 will swing levers 43 and 46 to decrease the tension in drive belt 47 for turning the airspeed indicator drive pulley 48 so that the airspeed indicator will show a reduced air speed. Such reduction in air speed will, however, be less than that indicated when the control wheel 3 is moved rearward without the throttle being pushed forward. The greater forward movement of the link 53, however, will swing the bell crank 55 for reducing the tension on the rate-of-climb indicator drive belt 57 a greater amount so that the pulley 58 will be turned farther in a clockwise direction to indicate a greater increase in the rate of climb.

The airspeed indicator 7, the artificial horizon 8 and the rate-of-climb indicator 14, the operation of which has been thus far described, all indicate instantaneous conditions. If a climb or glide is continued, however, the altitude of the aircraft will be altered substantially and the altimeter 9 is actuated to indicate this circumstance. To accomplish this operation, a double-acting altimeter-energizing switch 60 is located for actuation by a rotative cam 61 turned by swinging of the bell crank 55 by forward or rearward movement of the drive link 53.

The double-acting switch 60 is electrically connected to the altimeter drive motor 62 shown in FIG. 14. The armature of this motor can rotate in one direction or the other to swing crank 63 correspondingly for driving the speed-reducing belt combination 64 to turn the altimeter drive pulley 65. Rotation of the motor 62 in one direction will therefore progressively increase the reading of the altimeter 9 whereas rotation of the motor in the opposite direction will progressively decrease the reading of the altimeter.

When the control wheel 3 and the throttle 5 are held in a position such that the rate of climb indicator 14 indicates an ascent or a descent for an appreciable period of time, the altimeter 9 will be driven to indicate a corresponding accumulated increase or decrease in altitude. Such altitude change indication is qualitative rather than precisely quantitative because the switch 60 is simply of the make-and-break type and is not a rheostat. When switch-actuating cam 61 is turned far enough to close a circuit through switch 60 the altimeter-driving motor 62 will begin to operate, but it will operate at a constant speed irrespective of the extent of movement of the control wheel 3 and/or the throttle 5.

It will be understood that the conditions described with reference to FIGS. 6 to 12, inclusive, are only representative conditions and the control wheel 3 and throttle 5 can be moved separately or conjointly different amounts. Also, manipulation of the control wheel 3 has been described as only forward or rearward without being turned, but such control wheel may be turned either independently of or in conjunction with a forward or rearward movement of the wheel.

FIG. 13 illustrates the condition in which the control wheel 3 has been turned counterclockwise from the straight flight condition represented by FIG. 5, which would simulate a turn to port, without the control wheel being moved forward or rearward. Such manipulation of the control wheel rotates the control wheel shaft 4 to tilt posts 66 projecting radially upward from such shaft. The upper ends of these posts are connected by and support a sleeve 67, through which extends a cranked control rod 68. The crank end of this control rod is connected to a portion of lever 69 spaced from pivot 70 which supports such lever for swinging. This lever in turn is connected to a shorter driven lever 71 by a connecting link 72.

The driven lever 71 is mounted for swinging on a drive shaft 73, carrying the needle of the turn indicator 12. Consequently, as the posts 66 are tilted by rotation of the control wheel 3, the sleeve 67 is displaced orbitally to move the cranked control rod 68 bodily. Such control rod movement is effected irrespective of the position of forward or rearward reciprocation of shaft 4 because such reciprocation will slide sleeve 67 freely along rod 68 without displacing it lengthwise.

As the rod 68 is moved orbitally it will swing lever 69 in the corresponding direction, which in turn will move link 72 to swing lever 71 for actuating the turn indicator. Such swinging of lever 69 will also effect rotation of shaft 74 of the artificial horizon 8 by swinging arm 75 carried by such shaft, which is connected to the lever 69 by link 76. Rotation of shaft 74 will tilt the artificial horizon line to represent banking of the airplane.

The turn indicator 12 and artificial horizon 8 indicate instantaneous departures of the airplane from a straight course. As simulated turning of the airplane is continued, the heading of the airplane will be altered, and such heading can be recorded on a simulated chart C to plot the course of the airplane. To accomplish this operation, the swinging of lever 69 through an appreciable angle closes one or the other of the recorder-controlling switches 77 by moving against the control arm of one switch or the other the abutment 78 carried by the lever arm 69.

Closing of one or the other of the switches 77 will energize a reversible heading motor 79 to rotate in one direction or the other. Such motor rotates an output pulley 80 that drives belt 81 connected to turn pulley 82 mounted on the directional gyro drive shaft 83. By rotation of such drive shaft, the bearing indicating disk of the directional gyro 13 is rotated to indicate change in heading of the airplane as the control wheel 3 is maintained in turned condition in one direction or the other.

Rotation of the heading motor 79 also drives the recorder-orientation drive chain 84 which extends around the driving sprocket 85 turned by motor 79 and the transition-driven sprocket 86 mounted on the swinging end of the primary recorder support arm 87. Such transition sprocket is coaxial with and drives a pulley 88. This pulley, and a second pulley 89, mount the secondary recorder orientation drive belt 90. Pulleys 88 and 89 are supported on the secondary support arm 91, which with arm 87 forms dogleg linkage.

A shaft 92 journalled in the swinging end of arm 91 carries pulley 89 on its upper portion that will be turned by turning of such pulley. The lower end of such shaft supports the recorder head 93 in the position such that its marking wheel 94 contacts the chart C at a point in alignment with the rotative axis of the shaft 92.

The recorder head is moved over the chart by rotation of the marking wheel 94 effected by contact of the periphery of the friction drive wheel 95 with the periphery of such marking wheel. Such friction wheel is turned by an electric motor 96 mounted on the recording head. This motor is energized whenever the electrical system is energized for recording a navigational problem either by manipulation of a master switch or closing of a switch accomplished by moving the throttle 5 forward a predetermined distance to approximate flying speed. The speed of motor 96 does not, however, vary progressively with change in the reading of the airspeed indicator, but normally operates at constant speed.

If it were desired simply to record on the chart C the course of the airplane resulting from turning the control wheel 3 in one direction or the other, the upper portion of the mechanism shown in FIGS. 14 to 17, would not be required. It is desirable, however, to actuate very high frequency omnirange (VOR) and automatic direction finder (ADF) instruments in connection with the recorder.

For this purpose a downwardly-opening guide channel 97 is mounted on the lower end of a shaft 98 to swing with rotation of such shaft. The axis of such shaft extends in vertical registry with the center of the polar chart C, which chart center represents a VOR station location. A knob 99 mounted on the upper end of shaft 92 is received snugly, but not tightly, in the channel so that it can move freely along the channel. Such knob can be of anti-friction material, such as of Teflon, or may be a roller if preferred.

If the recorder head 93 is oriented so that its movement is along a radius of the polar chart with which the guide channel 97 registers, such channel will remain stationary. If the recorder head is turned by the orienting motor 79 so that the movement of the recording head is no longer radial, the knob 99 will swing the channel 97 and correspondingly rotate shaft 98 about the axis of such shaft and the chart center. Such rotation of shaft 98 in turn will rotate the VOR drive pulley 100 secured on such shaft to drive belt 101 passing around guide pulleys 102 to turn the driven VOR pulley 103. This pulley is mounted on the shaft 104 of the monitoring VOR instrument 11 to turn the VOR needle. Pulley 105, loosely mounted on shaft 104, is driven by belt 106 which passes around guide pulleys 107 and 108 to engage a driving pulley 109 mounted on shaft 110 turned by the disk of the student's VOR indicator 10. Such disk can be adjusted by the student turning the omnibearing selector (OBS) knob 10'.

As the channel 97 is swung by movement of the recorder head, the needle of the monitoring VOR instrument 11 will be turned correspondingly to indicate a change in bearing between the location of the airplane and the VOR transmitting station.

To make the student's VOR instrument 10 more realistic, the course deviation indicator (CDI) needle can be movable by a control knob on the instrument panel. Rotation of such knob exerts a pull on the drive line 111, shown in FIG. 14, which is tensioned by spring 112. Such line is connected to the arm 113 connected to the needle which is carried by the mounting 114. Such instruments can also be indicative of an instrument landing system (ILS) instrument by having a swingable, generally horizontal needle to indicate the landing glide slope. Alternatively such needle may be shifted to indicate "to" or "from" zones of the VOR. Such needle can be swung by rotation of another knob on the instrument panel connected to the drive line 115 also shown in FIG. 14. This line is tensioned by spring 116 and is connected to the arm 117 for the glide slope needle supported by mounting 118.

As mentioned above, the motor 96, which drives the recorder head 93 is a constant speed motor, but a tachometer 16 can be provided on the instrument panel to reflect the relationship between presumed engine speed and air speed. As shown in FIG. 4, such tachometer is driven by a drive belt 119 connected to the end of lever 34 adjacent to the throttle 5. Such drive belt passes over idler pulleys 120 and 121 and around the tachometer drive pulley 122 to the belt-tensioning spring 123.

In addition to driving the VOR instruments, an automatic direction finder (ADF) 15 can be driven from shaft 98. For this purpose the casing of the ADF drive motor 124 is mounted on the shaft 98 to be turned with the shaft. The output shaft 125 of such motor and shaft 98 are rotatively mounted in a bracket 126 mounted on the chassis.

As shown best in FIG. 14, on the output shaft 125 is mounted the ADF drive pulley which drives belt 128 passing over guide pulleys 129 to drive the driven pulley 130 mounted on the ADF operating shaft 131. Such shaft carries the ADF needle. Consequently shaft 131 and the ADF needle will be turned as the result both of the swinging of the channel 97 and the energization of motor 124 which is connected in parallel with the motor 79. The ADF setting knob 15' carries the pulley 132 which drives belt 133 to turn the ADF disk-adjusting pulley 134.

In the modified apparatus shown in FIGS. 17 through 20, the VOR indicator or localizer needle 135 is driven by the recorder mechanism instead of simply being swingable manually for demonstration purposes. The needle is suspended from its mounting shaft 136 at the top of the VOR indicator, and such shaft is support for rotation by the bracket 137. The lower end of the needle-swinging lever 138, depending from shaft 136, is received in the lever-swinging yoke 139 mounted on one end of a bell crank 140. Another yoke fork 141 straddles the flange 142 projecting radially from a sleeve 143, which sleeve is mounted on shaft 144 attached to the omnibearing selector (OBS) knob 10'.

The shaft 144 and needle-actuating flange 142 are interconnected for conjoint rotation but relative axial sliding by a radial pin 145 projecting from the shaft being slidably received in a slot 146 in the sleeve 143. Such sleeve also carries a radially projecting arm on which a cam-follower roller 147 is mounted to engage the face of a disk 148 disposed in a plane inclined relative to the axis of shaft 144 and sleeve 143.

The inclined disk 148 is carried by a sleeve 149 also mounted on shaft 144, but independent of sleeve 143. Sleeve 149 is rotatable relative to shaft 144, but cannot move axially along such shaft. The cam roller 147 is held in contact with the face of the inclined cam disk 148 by a helical compression spring 150 engaged between the flange 142 and an abutment on shaft 144. Such abutment is illustrated in FIGS. 18 and 20 as pulley 151 secured to the shaft.

Relative rotational movement between the cam 148 and the cam-follower roller 147 will effect movement of sleeve 143 and its flange 142 lengthwise of shaft 144. Such movement will cause the flange to engage the yoke 141 of bell crank 140 to swing such bell crank and, consequently, to cause yoke 139 on its other arm to swing the needle-swinging lever 138. Such relative rotation of the cam and cam follower may be accomplished either by rotation of the cam or by rotation of sleeve 143 or both.

The belt 101 is connected to the recorder head driven channel 97. As the bearing from the aircraft to the station changes the channel 97 will be swung, and the belt 101 will drive the sleeve 149 and cam disk 148 correspondingly because pulley 103 is fixed on sleeve 149. Rotation of the cam disk will effect movement of cam follower 147, sleeve 143 and flange 142 along shaft 144 to swing bell crank 140 and the VOR needle. The OBS knob can be turned to turn sleeve 143 for moving the cam follower in the same direction that the disk 48 was turned so that the flange 142 will be returned to its null position and needle 135 will return to its center position shown in FIG. 19.

The VOR disk can be set by turning the OBS knob 10' which will turn the drive pulley 151 for driving belt 152 engaging the driven pulley 153. This driven pulley is rotatably connected to the disk 153'.

In order to indicate the station orientation relative to the aircraft, the instrument panel 1' has in it a window through which the word "to" or the word "from" on a swingable flag 155 may be observed. Such flag is carried by a shaft 156 supported by a bracket 157. The cranked end of such shaft extends alongside a substantially semicircular cam 158 engageable by a cam-follower roller 159 on the cranked end of shaft 156. Such cam-follower roller is held in engagement with the cam by a torsion spring 160 reacting from the supporting bracket 157.

When the simulated flight path being recorded on the chart C is moving toward the center of the chart the cam 158 will be in a rotative position such that the cam-follower roller 159 bears on the flat side of the cam as shown in FIGS. 18 and 20, so that the word "to" will be observed through the window 154. When the recorder reaches the center of the polar chart it is necessary for the operator to reach through the opening 1" in the instrument panel and swing the channel 97 through 180°. Such reversal will drive the belt 101 to rotate cam 158 so that the cam-follower roller 159 will ride onto the semicircular side of the cam causing the shaft 156 to be rotated to raise the flag 155 into the position shown in FIG. 19, where the word "from" appears in the window 154. Continued progress along the simulated course will then be in a direction away from the VOR station location at the center of the chart.

Additional refinements may be included in the apparatus if desired. One such refinement includes the switch 161 shown in FIGS. 4 and 5 having an arm engageable with a cam 162 mounted on sleeve 44, which drives the airspeed indicator 7. Such cam can be coordinated with the airspeed indicator so that if the needle of the airspeed indicator turns in a counterclockwise direction beyond a predetermined position corresponding to assumed stalling speed of the airplane, the switch 161 will be closed to energize a suitable audible or visual warning.

In order to maintain accurate correlation between the various instruments and their actuating mechanisms, it is desired that the various drive belts be of a positive drive type, such as toothed belts engaging tooth pulleys. Also, it will be understood that a suitable source of power will be provided for energizing warning signals, providing illumination where desired and energizing drive motors described.

I claim:

1. An aircraft instrument operation trainer comprising a simulated flight control, a simulated engine control, a flight condition indicating instrument, and drive means connected to drive said instrument and including a main lever connected to said simulated flight control and an auxiliary lever pivotally mounted on one arm of said main lever at a location spaced from the rotative axis of said main lever, said auxiliary lever being connected to said simulated engine control for actuation of said instrument both by said simulated flight control and by said simulated engine control.

2. The trainer defined in claim 1, in which the flight condition indicating instrument is an air speed indicator connected to the auxiliary lever.

3. The trainer defined in claim 1, in which the flight condition indicating instrument is a rate-of-climb indicator connected to the auxiliary lever.

4. The trainer defined in claim 1, in which the flight condition indicating instrument is an altimeter connected to the auxiliary lever.

5. An aircraft instrument operation trainer comprising a simulated flight control including a shaft mounted for rotation and for lengthwise reciprocation, a turn-indicating instrument, and actuating means for said turn-indicating instrument including an elongated member extending parallel to said shaft and held against lengthwise movement and a member movable lengthwise of said elongated member by lengthwise movement of said shaft and operable to move said elongated member transversely of its length by rotation of said shaft in various lengthwise reciprocated positions of said shaft.

6. An aircraft instrument operation trainer comprising a simulated flight turn control, a recording surface, steerable recording means movable over said surface, dogleg linkage carrying said steerable recording means, orienting means carried by said dogleg linkage, drive means for effecting movement of said recording means over said recording surface, and steering means actuated by said simulated flight turn control for driving said orienting means to alter the direction of movement of said recording means over said recording surface effected by said drive means.

7. The trainer defined in claim 6, further including an aircraft heading-indicating instrument, and instrument-actuating means operated by movement of the recording means over the recording surface and operable to effect operation of the heading-indicating instrument.

8. The trainer defined in claim 7, in which the heading-indicating instrument is an ADF instrument.

9. The trainer defined in claim 8, in which the instrument-actuating means includes means operated by the simulated flight turn control independently of movement of the recording means over the recording surface.

10. The trainer defined in claim 8, in which the instrument is a VOR indicator.

11. The trainer defined in claim 10, in which the VOR indicator includes a shiftable "to" and "from" display and the instrument-actuating means includes means for shifting the display to alter the word displayed.

12. The trainer defined in claim 10, and manually-operable means connected to the instrument-actuating means for counteracting the effect of the recording means on the instrument-actuating means tending to effect operation of the VOR indicator.

13. The trainer defined in claim 12, in which the instrument-actuating means includes a cam member and a cam-follower member cooperating with said cam member, one of said members being movable by movement of the recording means over the recording surface and the other member being movable by the manually-operable means.

14. An aircraft instrument operation trainer comprising a simulated flight turn control, a recording surface, steerable recording means movable over said surface, drive means for effecting movement of said recording means over said recording surface, steering means actuated by said simulated flight turn control for altering the direction of movement of said recording means over said recording surface effected by said drive means, a VOR indicator, instrument-actuating means operated by movement of said recording means over said recording surface and operable to effect operation of said VOR indicator, and manually-operable means connected to said instrument-actuating means for counteracting the effect of said recording means on said instrument-actuating means tending to effect operation of said VOR indicator, said instrument-actuating means including a cam member and a cam-follower member cooperating with said cam member, one of said members being movable by movement of said recording means over said recording surface and the other member being movable by said manually-operable means.

* * * * *